Jan. 1, 1946. J. V. JOHANSEN 2,391,977
METHOD OF DECORTICATING FIBROUS MATERIALS
Filed Oct. 20, 1943
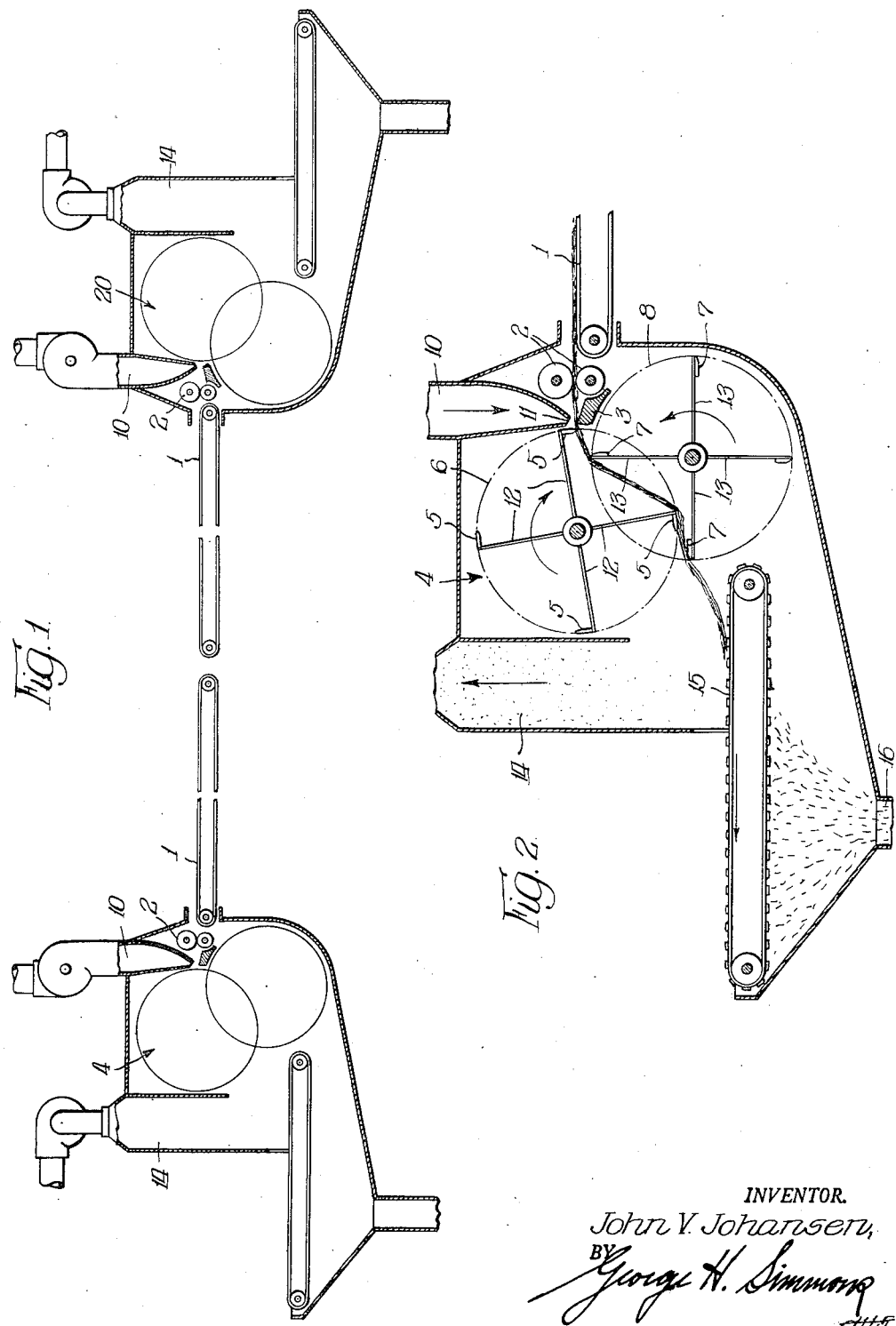
INVENTOR.
John V. Johansen,
BY George H. Simmons
Atty.

Patented Jan. 1, 1946

2,391,977

UNITED STATES PATENT OFFICE 2,391,977

METHOD OF DECORTICATING FIBROUS MATERIALS

John V. Johansen, Chicago, Ill.

Application October 20, 1943, Serial No. 506,950

7 Claims. (Cl. 19—9)

This invention relates to a new and improved method of decorticating fibrous materials, such as hemp, ramie, sisal and the like.

It is a main object of the invention to provide a method of decorticating fibrous materials which will provide a high percentage of long line fibres and a low percentage of tow.

Another object of the invention is to provide a decorticating method which produces the long line fibres in a straight unsnarled condition.

Still another object of the invention is to provide a method of decorticating fibrous materials which are unretted or partially retted.

Still another object of the invention is to provide a method of decorticating fibrous materials, the moisture content of which varies over wide limits.

Further objects of the invention not specifically mentioned herein will be apparent from the detailed descriptions and claims which follow, reference being had to the accompanying drawing, in which the method is diagrammatically illustrated, and in which:

Fig. 1 is a diagrammatic illustration of the method; and

Fig. 2 is a detailed diagrammatic illustration of a portion of the method.

Fibrous materials, such as hemp, grow as long slender stalks containing a pithy center core surrounded by a skin-like layer of fibre. The individual fibres in this layer are bound together and bound to the core by resinous sap. It is the fibrous part of the stalk that is of greatest commercial value, and the problem of quickly and economically separating the fibres from the pithy portion of the stalk, and from each other, has long been confronting the industry.

In a prior art, of which I am aware, are numerous machines designed to economically break up these stalks and separate the fibres from the short lengths of core material, which lengths are commonly known as hurds. In each of these prior art machines it has been necessary to ret the stalks prior to decorticating the same in the machine.

Retting, as it has usually been done, consists of exposing the stalks to the weather after they have been cut, so as to give the sun and rain an opportunity to destroy the sap which binds the fibres together and to the core. Retting has been done by cutting the stalks with special equipment arranged to lay the stalks in an orderly fashion at right angles to the direction of motion of the cutting machine. After the stalks so laid have been retted a desired amount, a turning machine has been employed to turn the stalks over so as to expose the other half of them, so that the retting may be uniform all around the stalk. After this step has been carried on to a desired degree, a binding mechanism has been employed to pick up the stalks and tie the same in bundles, which are then stored in shocks awaiting conveyance to a decorticating machine.

This retting process, being dependent upon the weather, and upon the judgment of the farmer as to when to cut, when to turn, and when to bind the crop, fails to produce fibre of uniform quality. Under-retting and over-retting both produce a weakened fibre, and when such stalks are decorticated by a prior art machine, a high percentage of short line fibres, known as tow, is produced. Furthermore, in order to carry out the natural process of retting, farmers have had to invest in an abnormal quantity of fairly expensive machinery, a factor which has contributed to the discouragement of the raising of fibrous materials, such as hemp, as a commercial American crop.

The decorticating machines and methods of the prior art, insofar as I am aware, even with perfectly retted stalks, have produced an abnormally high percentage of tow, and since tow can be sold only for about one-eighth as much as long line fibres, the value of the crops has been greatly reduced. Furthermore, the machines and processes of the prior art have been capable of producing optimum results only when the moisture content of the stalks has been held within rather narrow limits, and as a consequence it has been the practice to subject the stalks to the drying treatment prior to decorticating them, and the expense of producing long line fibre has been thereby materially increased.

All of the machines and processes of the prior art have operated on the principle of bending the stalks sharply in one direction and then re-bending in an opposite direction, this action breaking up the pithy portion of the stalks into short lengths called hurds. The broken portions of the stalks have been re-bent in opposite directions, and simultaneously scutched or combed by bars or brushes moving rapidly with respect to the stalk to remove the hurds from the fibres. The stalks have been moved in some cases longitudinally of their axes, and in other cases at right angles thereto. Breaking has been in some cases at right angles to the stalk, and in other cases obliquely thereof. The movement of the stalks has been progressively forward from one end of the machine to the other, and during this movement decorticating has been accomplished and the stalks removed from the machine, usually in a badly snarled condition, which necessitates further expensive combing and carding of the fibres at the spinning mill.

The present invention provides a method wherein stalks are moved longitudinally into contact with a breaking-scutching mechanism, and a stream of air is moved into this mechanism simultaneously with the movement of the stalks. This movement of the stalks is continued until about half of the stalk has been decorticated, and the movement is then reversed and the broken portion of the stalk re-scutched in a direction relatively opposite to the direction of the initial scutching thereof. Both the scutching and re-scutching of the stalks takes place in a stream of air moving more rapidly than the scutchers and stalks, with the result that long line fibre is produced with a minimum of tow, and the long line fibres are straight and untangled. The process is repeated on the remaining portion of the stalk.

This forward and back longitudinal movement of the stalk during decorticating, produces clean long line fibre, even though the stalks are unretted or partially retted, and even though the moisture content thereof varies over rather wide limits. Fibres so produced can be economically treated by chemical processes to prepare them for spinning, and since the chemical process can be controlled much more closely than can natural retting, a uniformly superior quality fibre results.

The method of carrying out the present process of the invention is diagrammatically illustrated in the drawing. The stalks are preferably spread in a thin layer upon a suitable conveyor 1, which is then moved to the left to engage the stalks with a feeding device, such as feed rolls 2, which securely hold and move the stalks longitudinally of their axes over a stationary breaking element, such as bar 3, into engagement with a breaker-scutcher mechanism 4. There are available on the open market a number of feeding, breaking and scutching devices suitable for use in the present invention. For example, in Patent #1,601,984, issued to Selvig, such a device is shown; also in Patent #2,079,661, issued to Patterson, a different and suitable device is shown. Still another breaker-scutcher arrangement is shown in Patent #2,197,683, issued to Burkhart, and many others may be found in the prior art.

As will be seen best in Fig. 2, the breaker-scutcher mechanism preferably consists of breaker bars 5, which are mounted for movement in a cylindrical orbit 6, and scutcher bars 7, mounted for movement in a cylindrical orbit 8, which orbit 8 intersects the orbit 6 first at a point adjacent to the stationary breaker bar 3, and again at a point spaced away therefrom. As the stalks are moved forwardly over the stationary bar 3, they are engaged by the breaker bars 5, and bent downwardly through an angle of from 50 to 70 degrees, depending upon the distance between the stationary breaker bar and the orbit of bars 5. The downwardly extending portion of the stalk is engaged by scutcher bar 7, moving in a relatively upwardly direction to bend the stalks upwardly at an angle varying from 70 to 90 degrees, depending upon the relative positions of the bars 5 and 7 at the instant bar 7 intersects the orbit of the bars 5. Both bars 5 and 7 move in a direction away from the stationary bar 3, so that the points of bending of the stalks or fibres moves progressively away from the bar 3, and consequently progressively towards the free ends of the stalks overhanging this bar.

This longitudinal bending of the broken portion of the stalk at points moving progressively towards the end thereof, whips the free ends of the fibre rapidly up and down. This action tends to loosen the hurds from the fibres, and to separate them therefrom. To aid in this separation, air from a high volume low pressure source is conducted through suitable means 10 to a rectangular port 11, which is disposed with its major axis at right angles to the axes of the stalks, and at right angles to the direction of motion thereof. This arrangement results in breaking and scutching the stalks in a stream of air which aids in separating the hurds from the fibres, and which supports free ends of the fibres so as to prevent them from becoming entangled one with another. Preferably blades 5 are connected to the axis of their rotation by vanes 12, and blades 7 connected to the axis of their rotation by vanes 13, which vanes revolving at high speed generate back pressures which aid in keeping the air stream intact and capable of supporting the free ends of the fibres.

Inasmuch as the bundles of stalks are bundled and stacked, usually in a field, for a considerable period of time before being decorticated, they are usually fairly dusty, and the quality of the fibre can be improved by cleaning. To this end suction is applied to the free ends of the fibres through suitable means, such as duct 14, to draw off the dust shaken loose from the fibres by the action of the scutcher bars. Preferably the degree of suction is controlled so that it is unable to pick up the short lengths of fibre known as tow, which tow is matted into small fluffy balls by the action of the beaters and scutchers, and allowed to fall upon a suitable conveyor 15, which preferably consists of slot-like construction, so that any hurds blown out of the scutchers by the air stream may fall through the conveyor and be conducted out of the device by suitable means, such as duct 16. The conveyor 15 extends out of the device, permitting the tow to be picked off of it and conveyed to a baling mechanism, which prepares it for shipment to paper mills and the like.

After approximately one-half of the length of the stalk has been so treated, the direction of motion of conveyor 1 and feeding device 2 is reversed, and the free ends of the fibres pulled through the scutcher mechanism in an opposite direction. This reversed motion of the stalks may be continued to engage the unbroken ends thereof, with a second and similar decorticating mechanism indicated generally at 20 in Fig. 1. It will be noted that the stalks are securely held by the feed rolls at all times when in engagement with the scutchers, and as a result matting and snarling of the fibres is minimized and often entirely eliminated.

Although the stalks of fibrous material, such as hemp, are long, they are not true cylinders, but rather are somewhat larger at their butt ends than at their tip ends. It has been found that the percentage of tow can be reduced by moving the stationary bar 3 of the mechanism that is to operate on the butt ends of the stalk farther away from the orbit of the breaker bar 5, and by advancing the breaker bars 7 so that they intersect the orbit of bars 5 while the bars 5 are approximately 30 degrees from this point of intersection. This adjustment results in reducing the angle through which the stalk is bent, first in one direction and then in the opposite direction. If a two ended device, such as is shown in Fig. 1 is employed, one end may be adjusted for the butt ends of the stalks, and the other for the tip ends, and a larger percentage of long line fibre thereby secured. This is particularly advantageous when fibres of six or seven foot length are produced for use in rope making and the like. When shorter fibres are desired for the so-called soft spinners, stalks may be cut to length prior to decorticating, and a smaller single end machine employed, and the stalks turned end for end during the processing thereof.

It has been found that in addition to producing a larger percentage of long line fibre, and a consequent smaller percentage of tow, the method of the present invention is capable of cleaning the hemp which is wholly unretted and hemp which has been but partially retted and, furthermore, the method has been found to function satisfactorily, even though the moisture content of the stalks is considerably higher than the process and machines of the prior art have been capable of handling.

The introduction of a forcible stream of air into the stalks at the point of breaking, and the scutching of the stalks in this stream, leaves the fibres much cleaner and freer from hurds than has been heretofore possible. The movement of the fibres against the direction of scutching, and against the direction of the air stream as the fibres are disengaged from the mechanism, leaves the fibres in a straight and completely unsnarled condition. The process is capable of being employed at low cost with machinery which is relatively inexpensive to build and maintain, and since the process makes the production of high quality long line fibre less dependent upon variations in the weather, and knowledge of the farmer in the control of retting, it is distinctly advantageous over the prior art processes.

Throughout the foregoing description I have referred to the material as stalks, this form being the most common form of material from which fibres are obtained. However, sisal fibres are obtained from the leaves rather than the stalks, and the method of the present invention has been found to be applicable to this material. The fibres in sisal run longitudinally of the leaf, which may be decorticated in exactly the manner hereinbefore explained for stalks.

While I have chosen to show and describe my invention by illustrating a preferred embodiment of it, I am not to be limited thereby, as there are many modifications and adaptations which can be made by one skilled in the art within the teachings of the invention.

Having thus complied with the statutes, and shown and described a preferred embodiment of my invention, which I consider new and desire to have protected by Letters Patent is pointed out in the appended claims.

What is claimed is:

1. The method of decorticating and cleaning fibrous material such as hemp which comprises, spreading the material in a uniform layer and securely holding it therein, breaking the material progressively from one end thereof by bending the same alternately in opposite directions, moving a stream of air through the region of breaking and along the broken material to support the same in a path extending downwardly and outwardly from said point, scutching the material in said air stream progressively from said one end thereof, and rescutching the broken material in said air stream progressively toward said one end.

2. The method of decorticating fibrous material having a woody portion which comprises, holding the material securely and moving it longitudinally of its fibres at a uniform speed, bending the material sharply first in one direction and then in the opposite direction to break the woody portion into short lengths, moving a stream of air through the region of breaking and longitudinally of the fibres to support the broken material in a path extending downwardly and laterally from said region of breaking, scutching the broken material by bending the same out of said path alternately in opposite directions and moving the points of bending progressively toward the leading end of the material, reversing the direction of movement of the material, and rescutching the material in a direction relatively opposite to the direction of movement thereof.

3. The method of decorticating fibrous material having a woody portion which comprises, generating a high speed high volume low pressure air stream and directing the same outwardly and slightly downwardly from a stationary breaking bar, moving unbroken fibrous material across said bar and into said air stream in the same direction as but at a slower speed than the airstream, bending the material sharply over said bar to break up the woody portion thereof, supporting the broken material by said air stream, while the material is moving in a path extending outwardly and downwardly from said bar, bending said broken material alternately upwardly and downwardly from said path at points moving progressively towards the leading end of the material to remove the broken woody portions, and reversing the direction of motion of the material while continuing to bend the same to remove the material from said airstream.

4. The method of decorticating fibrous material having a woody portion which comprises, moving the material forwardly at a relatively low uniform speed, bending the material repeatedly first in one direction and then in 'he opposite direction to break the woody portion into short lengths, scutching said material simultaneously with repeated bending at points moving in the same direction as the movement of the material, moving air through the material in the regions of breaking and scutching in the same direction as the movement of the material but at a higher speed and in sufficient volume to support the material, reversing the direction of movement of the material, scutching and repeatedly bending and moving air through the material all in a direction opposite to the direction of movement of the material to straighten the fibres thereof.

5. The method of decorticating and cleaning fibrous material which comprises, spreading the material in a uniform layer, breaking the material by bending the same alternately in opposite directions, creating a relative movement between the material and bending to move the point of bending progressively along the material from one end thereof, blowing an air stream longitudinally along the material in the region of bending and in sufficient volume to support the material, scutching the broken material in said air stream, reversing the relative movement between the bending and material after a portion of the material has been broken and scutched, rescutching the broken portion of the material during said reversed relative movement, continuing said reversed relative movement, breaking the unbroken portions of the material by bending the same alternately in opposite directions progressively along the material from the opposite end thereof, blowing a second air stream longitudinally along the material in said second region of bending and in sufficient volume to support the material, scutching the material in the second air stream, again reversing the relative movement of said material and bending and rescutching said material during said latter relative movement.

6. The method of decorticating fibrous material having a woody portion which comprises, generating a high speed high volume low pressure air stream and directing the same laterally and slightly downwardly from a stationary breaking bar, moving unbroken fibrous material across said bar and into said air stream in the same direction as but at a slower speed than the air stream, bending the material sharply over said bar to break up the woody portion thereof, supporting said broken material by said air stream while the material is moving in a path extending laterally and downwardly from said bar, bending said broken material alternately upwardly and downwardly from said path at points moving progressively towards the leading end of the material to remove the broken woody portions, reversing the direction of motion of the material after a portion thereof has been broken while continuing to bend the same to remove the material from said air stream, generating a second high speed volume low pressure air stream and directing the same laterally and slightly downwardly from a second stationary breaking bar, continuing said reversed movement of the material to move the unbroken portion thereof across said second stationary bar and into said second air stream in the same direction as but at a slower speed than said second air stream, bending the material sharply over said second bar to break up the unbroken portion thereof, supporting said latter portion after breaking by said second air stream while the material is moving in a path extending laterally and downwardly from said second bar, bending said latter material alternately upwardly and downwardly from said latter path at points moving progressively toward the leading end of the material to remove the broken woody portions, and again reversing the direction of movement of the material after all of said unbroken portion of it has been broken while continuing to bend the same to remove the material from said second air stream.

7. The method of decorticating fibrous material having a woody portion which comprises, holding the material securely and moving it longitudinally of its fibres at a uniform speed, bending the material sharply first in one direction and then in the opposite direction to break the woody portion into short lengths, moving a stream of air through the region of breaking and longitudinally of the fibres to support the broken material in a path extending downwardly and laterally from said region, scutching the broken material by bending the same out of said path alternately in opposite directions and moving the points of bending progressively toward the leading end of the material, reversing the direction of movement of the material after approximately half of it has been so broken and scutched, rescutching this broken portion in a direction relatively opposite to the direction of movement to straighten the fibres, continuing said reversed movement at a uniform speed, bending the other half of the material sharply first in one direction and then in the opposite direction to break the woody portion thereof into short lengths, moving a second stream of air through the second region of breaking and longitudinally of the fibres to support the material in a path extending downwardly and laterally from said second region, scutching said latter material by bending the same out of said path alternately in opposite directions and moving the points of bending progressively toward the leading end of the material, again reversing the direction of movement of the material after all of said second half of it has been broken and scutched, and rescutching said second half of the material in a direction relatively opposite to the direction of said latter movement to straighten the fibres.

JOHN V. JOHANSEN.